United States Patent
Mohanty et al.

(10) Patent No.: US 8,054,881 B2
(45) Date of Patent: Nov. 8, 2011

(54) VIDEO STABILIZATION IN REAL-TIME USING COMPUTATIONALLY EFFICIENT CORNER DETECTION AND CORRESPONDENCE

(75) Inventors: Kamini Kanta Mohanty, Orissa (IN); Venkatagiri Subbaraya Rao, Karnataka (IN); Jeremy Craig Wilson, Delta (CA)

(73) Assignee: Honeywell International Inc., Morristown, NJ (US)

(*) Notice: Subject to any disclaimer, the term of this patent is extended or adjusted under 35 U.S.C. 154(b) by 497 days.

(21) Appl. No.: 12/341,630

(22) Filed: Dec. 22, 2008

(65) Prior Publication Data

US 2010/0157070 A1 Jun. 24, 2010

(51) Int. Cl.
*H04N 7/12* (2006.01)
(52) U.S. Cl. .................... 375/240.09; 375/240.26
(58) Field of Classification Search ............... 348/208.1; 375/240.08, 240.09
See application file for complete search history.

(56) References Cited

U.S. PATENT DOCUMENTS

2008/0231706 A1* 9/2008 Connell et al. ............... 348/155
2009/0060277 A1* 3/2009 Zhang et al. .................. 382/103

OTHER PUBLICATIONS

Marcenaro, L.; Vernazza, G.; Regazzoni, C.S.;, "Image stabilization algorithms for video-surveillance applications," Image Processing, 2001. Proceedings. 2001 International Conference on, vol. 1, no., pp. 349-352 vol. 1, 2001 doi: 10.1109/ICIP.2001.959025 URL: http://ieeexplore.ieee.org/stamp/stamp.jsp?tp=&arnumber=959025&isnumber=20726.*

* cited by examiner

*Primary Examiner* — King Poon
*Assistant Examiner* — Nathan Sportel
(74) *Attorney, Agent, or Firm* — Husch Blackwell

(57) ABSTRACT

Real-time image stabilization using computationally efficient corner detection and correspondence is provided. The real-time image stabilization performs a scene learning process on a first frame of an input video to obtain reference features and a detection threshold value. The presence of jitter is determined in a current frame of the input video by comparing features of the current frame against the reference features using the detection threshold value. If the current frame is found to be unstable, corner points are obtained from the current frame. The obtained corner points are matched against reference corner points of the reference features. If the number of matched corner points is not less than a match point threshold value, the current frame is modeled using random sample consensus. The current frame is corrected to compensate for the jitter based on the results of the modeling.

28 Claims, 5 Drawing Sheets

VIDEO STABILIZATION IN REAL-TIME USING COMPUTATIONALLY EFFICIENT CORNER DETECTION AND CORRESPONDENCE

I. FIELD OF THE INVENTION

The present invention relates generally to video stabilization; and more specifically, to video stabilization in real-time using corner detection and correspondence.

II. BACKGROUND OF THE DISCLOSURE

Environmental disturbances such as wind coupled with improper camera mounting may give rise to shaky video in the case of video cameras mounted in outdoor environments. Improper camera mounting may also give rise to shaky video even in an indoor environment. The camera shake results in frame-to-frame distortion, image blurring, or a combination of both depending on the frequency of the disturbance. Camera shake (herein also referred to as "jitter") is disturbing for human viewer, reduces compression efficiency, and may result in video unsuitable for video analytics, such as motion detection and tracking. Hence, there is a need to reduce camera shake in order to reduce the burden on the operator and improve the reliability of video analytics by reducing the number of false identifications. Reduced jitter also results in lower bit rates for compressed video. Consequently, less demand is placed on the computer network bandwidth when the video is transmitted, or on storage space requirements. Hence, camera stabilization is an important front-end feature of any surveillance system in order to achieve better overall performance.

Camera stabilization can be carried out by sensing the disturbance using active sensors, such as accelerometers or gyroscopes, and applying corrections either in hardware or software based approaches. The performance of those systems is limited by the intrinsic sensitivity of the sensors. This approach is typically taken for camcorder image stabilization, and is suited to the low frequency motion associated with handheld cameras. An advantage of systems based on accelerometers is the ability to compensate for camera jitter (or instability) even in featureless images under low illumination conditions, and are not influenced by objects moving in the field of view.

However, the disturbance-sensing approach is less effective for eliminating high frequency motion associated with the vibrations experienced by mounted cameras used in video surveillance and security. Such vibrations may be induced by wind or traffic, for example.

The surveillance field demands a robust technique for computation of homographies to deal with dynamic scene changes associated with moving objects. Consequently, a stabilization system for moving and Pan-Tilt-Zoom (PTZ) cameras needs to differentiate between intentional camera motions and unintentional camera movements.

III. SUMMARY OF THE DISCLOSURE

A method is disclosed for performing the steps of providing a real-time video as an input video; performing a scene learning process on a first frame of the input video to obtain reference features and a detection threshold value; determining presence of jitter in a current frame of the input video by comparing features of the current frame against the reference features and comparing the match parameter with a match threshold; obtaining a new set of corner points from the current frame in a computationally efficient manner using the detection threshold, if jitter is present in the current frame; matching the obtained corner points with reference corner points of the reference features; determining if a number of matched corner points is not less than a match point threshold value; modeling deformation in the current frame, if the number of matched corner points is not less than the match point threshold value; and correcting the video frame based on the modeling.

Additionally, a system is disclosed, which includes a video source for generating a video stream having a plurality of video frames; a scene learning section for performing a scene learning process on a first frame of the video stream to obtain reference features and a detection threshold value; a jitter determining section for determining a presence of jitter in a current frame of the video stream by comparing features of the current frame against the reference features using the detection threshold value; a modeling section for modeling the current frame if a number of corner points matched between corner points of the current frame and corner points of the reference features is not less than the match point threshold value; and a video correction unit for generating a corrected frame of the current frame based on the modeling.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF DISCLOSURE

Image Stabilization Algorithm

An image-based stabilization method can be either intensity based or feature based. An intensity based approach tries to make use of all pixels in an image to estimate the image transformation model, while a feature based approach attempts to estimate the model using motion vectors at a set of judiciously chosen feature points. A feature-based approach is computationally more efficient in comparison to an image-based approach.

Figure 1:
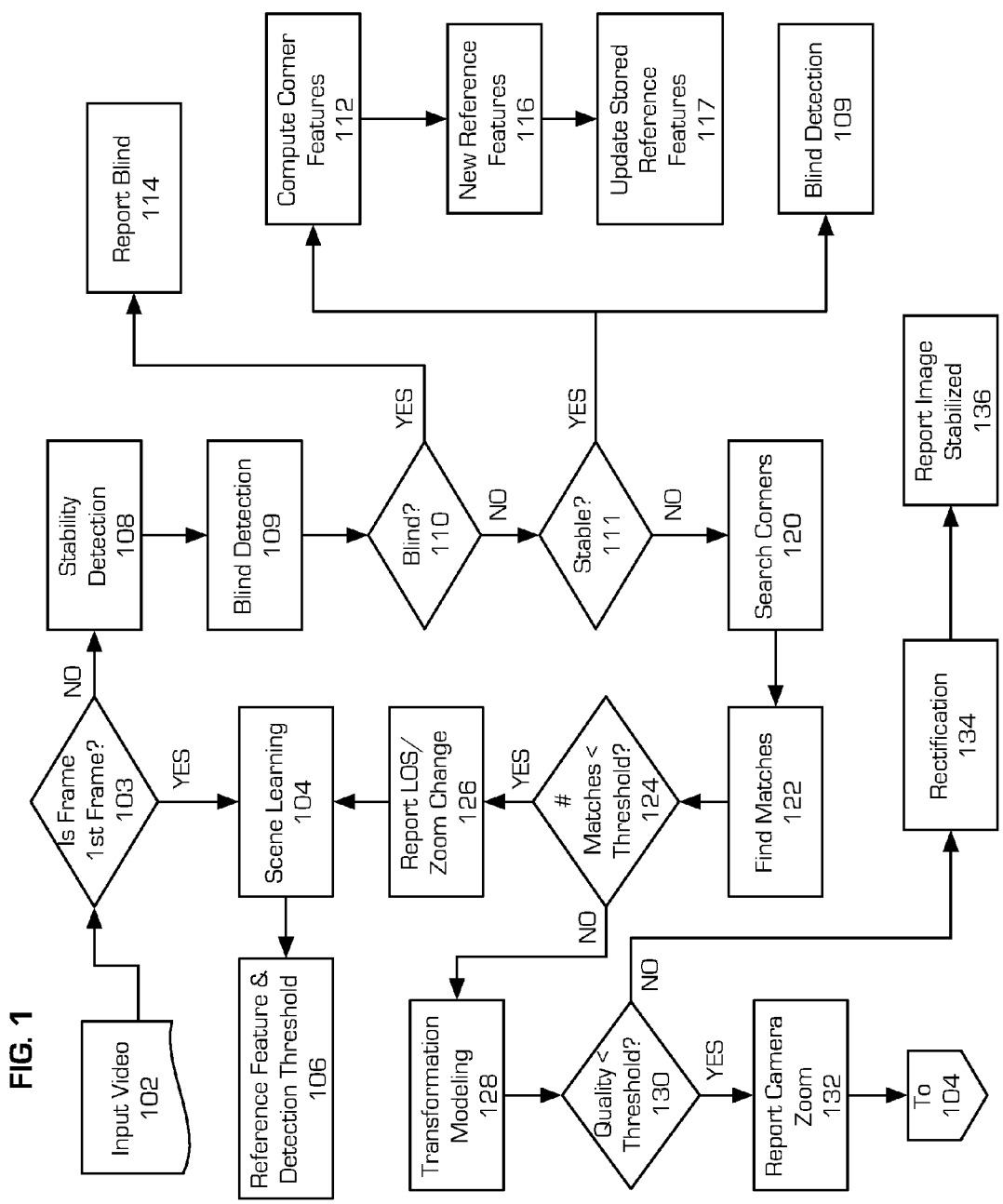
FIG. 1 illustrates a flow diagram of an embodiment of the present invention.

In the present invention, digitized video frames are available in a continuous sequence (either in real-time or off-line) and form the input to an image stabilization algorithm. The stabilized output retains the same image size and frame rate as the input. A flow diagram of the general approach followed in the stabilization method of the present invention is shown in FIG. 1. Detailed description of the process is provided following the general description of the flow diagram of FIG. 1.

The method employed in image stabilization of the present invention begins with receipt of an input video in step 102. It in step 103, the current frame is the first frame of the input video, the current frame is provided to a scene learning process in step 104. Subsequent frames of the input video are provided to a stability identification process in step 108. The scene learning in step 104 is performed when the provided video frame is the first frame of the input video or when a relearning process is initiated as discussed in further detail below. Otherwise, the scene learning step 104 is not utilized.

The scene learning step 104 identifies reference features while in step 106 the identified reference features are extracted and a detection threshold is calculated. Additionally, in step 106, the reference features and detection threshold are stored. The stability identification process (step 108) retrieves the reference features and a match threshold in identifying instability in subsequent video frames.

Stability, as contemplated in the present invention, refers to a video frame having features which correspond with reference features within a detection threshold tolerance, signifying that no appreciable change in the imaged scene has occurred in relation to the reference frame (i.e. the first frame of the input video). However, instability under this definition includes not only undesirable jitter of the camera, but also intentional changes in scenes caused by a change in field of view (FOV), change in line of sight (LOS), or a motion of an object such as a vehicle. The present invention differentiates between these desirable and undesirable types of instability in the video.

Stability detection is followed by blind detection in step 109. The blind detection algorithm makes use of local variance values that are computed as part of stability detection. In step 110, if a camera blind is observed a camera blind event is notified to the user in step 114 and no further processing is carried out on the current frame. The details of blind identification are discussed in greater detail below.

If, in step 111, the video frame is determined to be stable, the process continues to step 112 where a corner feature is computed using the detection threshold stored in step 106. Computing reference features using the detection threshold of step 106 is computationally more efficient than first time detection of corner features performed in step 104.

In step 117, new reference features obtained in step 116 replace existing reference points stored in step 106. Consequently, new frames will be analyzed for stability in step 108 using these new reference features. A stable input is reported and the input video frame is displayed in step 118.

In the case where the video is determined not to be stable in step 111, the process continues to step 120, where a search is performed to identify corner points in the video. Searching for a corner feature near an existing reference feature is computationally more efficient than detecting corner feature in step 104 or 112. In step 122, the identified corner points of the current video frame are matched against corner points of a reference video frame. If the number of matching corner points is less than a preset threshold value, in step 124, a Line of Sight (LOS) or Zoom change is presumed to have taken place in step 126 and the process initiates a relearning procedure by returning to the scene learning process of step 104.

If the number of matching corner points is not less than a preset threshold value, in step 124, the process continues onto step 128 where modeling is performed using random sample consensus (RANSAC). The quality of the model produced in step 128 is compared to a predefined quality threshold in step 130.

It in step 130, the model quality is less than the predefined quality threshold, the process continues to step 132. In step 132, the process determines that the camera zoom has changed, thus initiates a relearning process (scene learning) at step 104. However, if the model quality exceeds the quality threshold in step 130, the process continues to step 134.

At step 134, the jittery video frame is corrected using image rectification processes. The now corrected image is then sent as an output image and the stabilization (rectification) is reported in step 136. The reporting may be presented as an on-screen display message or as a log entry. U.S. patent application Ser. No. 09/062,007, incorporated herein by reference, discloses visual indicators and metadata appropriate for use in reporting results of the stabilization process of the present invention.

Reference Feature Computation

In a feature-based image stabilization method, a set of robust features are extracted and their correspondence are established across frames. Feature extraction methods, such as Moravec, Harris, KLT, Susan and SIFT, can be used for generating a large number of features for inclusion in the feature set. A commonly used solution is to compute these features repeatedly over each frame and establish their correspondence across frames. A feature extraction module takes the largest share of computation cost within the stabilization algorithm.

In the present invention, the first video frame is chosen as the initial reference frame and feature points are computed using a Harris or KLT corner detection method. In addition to reference feature extraction, scene dependent parameters are obtained as well that enable efficient feature extraction in subsequent frames. Moreover, features from all consecutive frames are not explicitly computed. Rather, the features are searched for in a local neighborhood of the reference features, which provides computational efficiency in the present invention.

If the input video is available in the form of RGB channels, then only one channel (for example, green) is used in the corner search step 120. Alternatively, an RGB image can be converted to a grayscale image. The grayscale image can then be used for identifying corner points. If input video is available in the form of YCbCr or YUV, the Y component can be used in place of the green color channel. A corner detection method such as Harris or KLT computes the corner strength at every pixel of the image.

A set of the strongest points (P points) need to be identified in the image based on their corner strength, while ensuring minimum separability between individual points. This minimum separation is achieved by ordering all points in the image in descending order of corner strength and picking up the strongest P points from the sorted list. This requires multiple traversals (P passes) through the sorted list, which is computationally intensive. The standard approaches are non-maxima suppression over local windows of for example, 3 3 and a detection threshold to reduce the number of corner points required to be sorted In non-maxima suppression, only the strongest points in the local window are used for further analysis. Use of non-maximum suppression over larger window size (i.e., 16 16) reduces the size of the sorted list, thereby making the search more efficient. However, non-maxima suppression performed in this way results in a non-optimum set of corner points.

Applying a detection threshold (ignoring all points below a predefined threshold) also results in significant reduction in computational load. However, it is not possible to find a threshold that will work efficiently across all scenes.

In the present invention, a sufficiently low threshold (preferably zero) is used for the first frame. A scene-specific threshold value is determined while detecting corner features from the first frame in the scene learning step 104 by fixing a threshold value as the strength of the Ith point in the sorted list (a typical value could be 10,000). In case the number of candidate points is less than I, the scene-specific threshold value is fixed at the strength of the last point in the sorted list.

The scene-specific threshold value generated in step 104 becomes the detection threshold for subsequent frames of the input video for feature detection during jitter identification in step 108 or updating of reference features as performed in steps 112, 116 and 117.

Jitter Identification

Whenever a new frame is received, it is first compared with the reference frame features to decide whether it has any jitter in step 108. For this purpose, a window (typically of 7 7 pixels size) around each reference point is chosen from the reference frame and the normalized cross correlation value is computed by selecting the corresponding area in the current image. This correlation is carried out only for one of the channels in the case of RGB input video. Alternatively, an RGB image can be converted to a grayscale image. The grayscale image can then be used for computing the correlation value. The Y component can be used in the case where the input video is available in $YC_bC_r$ or YUV format. This is repeated over all the feature points and the average value of the correlation coefficient over all the points is computed. If the average value of the correlation coefficient is greater than a threshold value (for example, 0.9), then it is presumed that there is no deviation between the current frame and the reference frame and hence the input video frame is sent to step 112 for updating reference features as described above. The input video frame is output without any modification in step 118 and a stable input report is generated.

Feature Point Correspondence

If the result of the jitter detection step 111 indicates the presence of jitter in the frame, then the corner features are detected in the current frame in step 120. A computationally efficient corner search strategy is adopted at this stage in which corner strengths are computed for the entire frame.

However, instead of sorting all points in descending order and scanning the sorted list for a set of strong points, as performed in the case of the first frame, each of the reference corner points is associated with a nearest strongest corner point in the current frame using a local search window of a pre-defined size in the matching step 122. The size of the search window is decided by the maximum amount of image shift anticipated due to jitter.

By choosing reference feature spacing in excess of twice the local search window size, each of the reference features call be uniquely associated with one of the features in the current image. In case the search window size is larger than half the corner feature spacing, each reference feature is associated with multiple features in the current frame. The match obtained at this stage is treated as a coarse match and provisional, because some of the correspondence may be invalid even for single (unique) association.

In case of multiple associations, the invalid associations need to be identified and dropped. A validation of the feature correspondence is carried out using normalized cross correlation (NCC). If NCC for the match points falls below a threshold (for example, 0.8), then the correspondence is treated as invalid and discarded.

Sub-pixel Accuracy Feature Matching

All valid feature correspondence result in match points with pixel level accuracy only. Sub-pixel accuracy is computed at these estimated offsets by fitting a second degree polynomial to local cross-correlation values. The cross-correlation values are computed for −1, 0 and +1 lags in both horizontal and vertical directions around the coarse match point. Subsequently, a second degree polynomial is fitted to the nine correlation measurements.

Assuming that initial correspondence is estimated with pixel level accuracy, these cross correlation values will form a convex surface around the coarse match point. The peak of the convex surface corresponds to the exact sub-pixel match. The solution for sub-pixel offset can be obtained by fitting a 2D polynomial to nine correlation values obtained through a local correlation with offsets of ±1 pixel. The 2D polynomial is denoted by:

$$P(x,y)=a+bx+cy+dxy+ex^2+fy^2 \text{ where}, -1 \leq x \leq 1 \text{ and } -1 \leq y \leq 1 \quad (1)$$

x and y are offsets in pixel and line directions, and a, b, c, d, e and f are polynomial coefficients. The coefficients a, b, c, d, e and f are obtained through a least squares fit to the nine correlation values. The subpixel offsets ($C_x$, $C_y$) are estimated using the polynomial coefficients as:

$$C_x(2bf-cd)/(d2-4ef) \quad (2)$$

$$C_y=-(b+2eC_x)/d \quad (3)$$

The line, pixel location (computed to sub-pixel accuracy) of the matched feature point along with the original reference point location are saved as matched pairs and used in the transform model estimation step 128.

Transform Model Estimation

The feature correspondence process, i.e. steps 120, 122 and 124 described above yields values corresponding to image displacement of feature points in horizontal and vertical directions. The global nature of image displacement can be a translation, rotation, scaling or a combination of all these. By fitting the displacement data obtained from the matched feature points to a model in step 128, it is possible to estimate the parameters of the model. Various mathematical models, such as, but not limited to linear conformal, affine, projective and polynomial function, can be used for this purpose.

The choice of model is decided by scene depth variation, camera orientation and nature of camera shake. For most cases involving a static camera, a simple translation model may be sufficient, while affine transformation is appropriate as a more generic solution.

The minimum number of match points required to establish a model depends on the model type. However, for achieving reliable performance, it is preferable to consider a larger number of data points than the required minimum and perform a least squares fit. In the process of doing a least squares fit, outliers are rejected by invoking the iterative minimization approach based on RANSAC. The RANSAC approach is depicted in FIG. 2 and discussed below.

Figure 2:
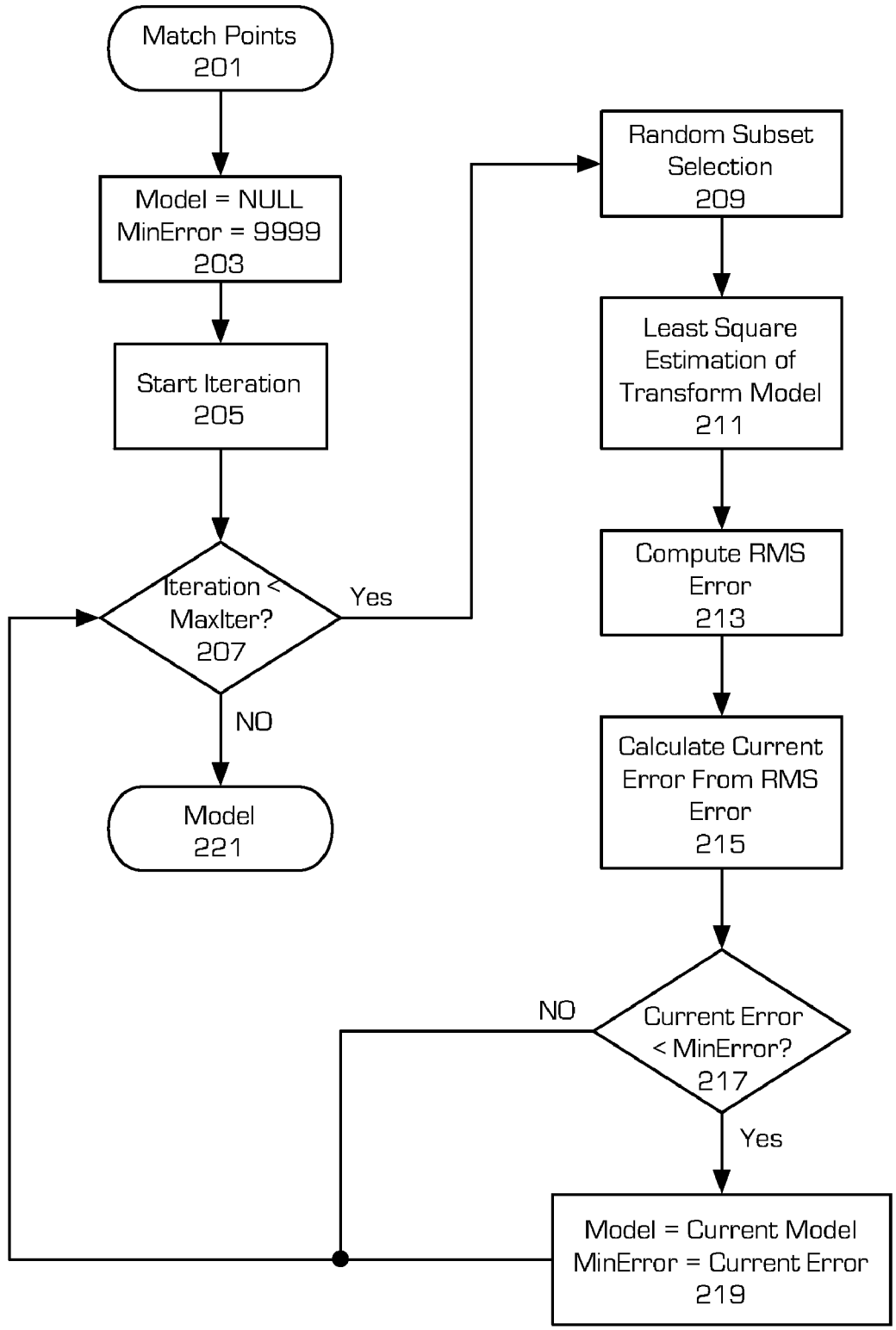
FIG. 2 illustrates a flow diagram of a modeling process implemented in step 128 of the embodiment shown in FIG. 1.

Under the RANSAC modeling approach, as shown in FIG. 2, match points generated in step 122 of FIG. 1 are provided in step 201. Initially, in step 203, the model type is set to NULL (i.e. no model) and the MinError value is set to an arbitrarily large number, for example 9999. The process starts in step 205 by beginning the first iteration. The iterations continue until a predetermined maximum number of iterations are performed as checked in step 207. Once the maximum iterations (MaxIter) of the modeling have been performed, the process ends at step 221 where the estimated model parameters are output for use in the rectification step 134.

If less than Me maximum number of iterations is performed, the process continues to step 209 where a random subset of the match points is selected. A least square estimation is performed on the match points selected as the subset in step 211 to compute a model. In step 213, the model computed in step 211 is applied on all match points identified in step 122 of FIG. 1 and the root mean square (RMS) error of each match point with respect to the model is calculated. Each point results in an error expressed in x and y coordinates (i.e., $e_x$ and $e_y$, respectively). The RMS error of the point is represented by $e_{rms}=\sqrt{(e_x+e_y)^2}$. In step 215, the RMS errors of all points are sorted in ascending order and an M-percentile (typical value of M being 35) is used as a summary error of the current model (referred to hereinafter as "current error"). Other statistical measures such as mode, median and mean can also be used in place of M-percentile.

The computed current error is compared with the MinError value in step 217. If the current error is not smaller than MinError, the process proceeds to step 207 for commencement of a new iteration. On the other hand, if the current error is smaller than MinError, the process continues to step 219, where MinError is set to the value of the current error and the model is set to the current model. The process then proceeds to step 207 to begin a new iteration using the newly set MinError value and model.

In some cases, the minimum error obtained for the RANSAC based transformation model is unacceptably high due to a poor model fit. This happens when the actual image deformation is different from one supported by the model. For instance, in case of modeling transformation as a simple translation model, a large model fit error is observed whenever there is a large change in the scene due to LOS change (Pan/Tilt) or FOV change (Zoom in/Zoom out). Image blur or the association of a majority of corner features with moving foreground objects, can result in large model error. In such cases, a camera zoom event is reported in step 132 and a new set of reference feature points are learned using the current image, as in step 104 of FIG. 1. Normally, such decisions are delayed and reference updating is carried out after a number of consecutive model failures in order to allow for situations where the model failure is the result of a temporary problem, such as a momentary loss of focus, etc. A model failure can also occur due to a lack of sufficient match points resulting from a change in the LOS of the camera.

Image Rectification

The model parameters estimated in the modeling step 128 are used to map the pixels in the current image to corresponding locations in the reference frame. Any of the commonly known interpolation methods such as nearest neighbor, bilinear or cubic convolution can be used for image rectification in step 134. Since the image shift and deformation are of sub-pixel accuracy, the quality of bilinear interpolation is superior to nearest neighbor interpolation, resulting in the least residual jitter in the output. In order to reduce the computation load, bilinear interpolation is implemented using a pre-computed interpolation kernel. Depending on the amount and direction of image shift from one frame to the next, some of the pixels along the border may not have valid pixels, because these border zones may not have been imaged within the current frame due to jitter.

Assuming that due to jitter, the maximum displacement between successive frames at a given resolution is less than 'B' pixels (a typical value of 'B' could be 10), 'B' pixels are blanked out along the border on all sides. This avoids unnecessary variations along the image border in the stabilized output.

Reference Updating

Reference features extracted from the first frame may subsequently get lost due to occlusion by foreground object or illumination change. Moreover, a LOS or FOV change requires updating of reference features. Also, regular updating of reference features may be required to account for scene dynamics.

In the present invention, the reference features selected in the very first frame are updated under the following four scenarios:

1. on occurrence of every nth stable input frame (typical value 5);
2. after pth consecutive detections of LOS change (typical value 2);
3. after pth consecutive detections of model failure i.e. model error exceeding a user-defined threshold (typical value 2); and
4. at any time if there is no reference update within the last kth frames (typical value 30).

Reference updating, or relearning, is carried out by detecting corner feature points using the pre-computed detection threshold. The detection threshold is continuously adapted so that the number of candidate corner points are within a minimum and maximum limit. Detection threshold is used to discard all candidate corner points below the learned threshold. In case, the number of candidate points in the sorted list falls below a predefined minimum limit, the threshold is reduced proportionately. The threshold is increased, if the number of candidate points goes beyond a predefined upper limit.

Stabilizing Interlaced Video

In case of interlaced video, the odd and even fields in a given video frame can undergo different amounts of shift and blur, because the two fields are captured at different times (for example, 1/60th of a second apart in the NTSC video standard). To handle this scenario, it is necessary to separate the odd and even fields and then stabilize them separately before combining them.

In this case, reference features are picked up separately from the odd and even fields. From a computational efficiency prospective only one of the two fields can be used to compute the reference features. For the subsequent frames, feature extraction, matching and transformation modeling are carried out separately for the odd and even fields. The quality of odd and even fields (degree of blur) is assessed using mean corner strengths of the odd and even fields. Depending upon the degree of blur and model quality, either one of the two fields or both are used for stabilization.

Line of Sight (LOS) Change Detection

If the quality of the model generated in step 128 is less than a quality threshold percentage (for example, less than 12% of the mean quality of past 30 frames), then the process determines that a drastic change in scene has occurred due to either a LOS (Line of Sight) change or a zoom change in step 132. As a result the current frame is sent to the output without any modification in step 132. In addition, the current frame is directed to the scene learning step 104 in order to generate new reference features based on the current frame.

Camera Blur and Blind Detection

Camera blind and blur detections are implemented as features of the stabilization method and do not require any additional computation. Blur results in a decrease in strength of corner points. Temporal Mean ($\mu$) and standard deviation ($\sigma$) of average strength of corner points is computed recursively using the mean corner strength of individual frames. A valid value for $\mu$ and $\sigma$ is available for blur detection after successive estimation of these values over N frames (typically 30 frames). In cases where the average corner strength of the current frame falls below ($\mu-3\sigma$), the frame is declared as blurred.

Figure 3:
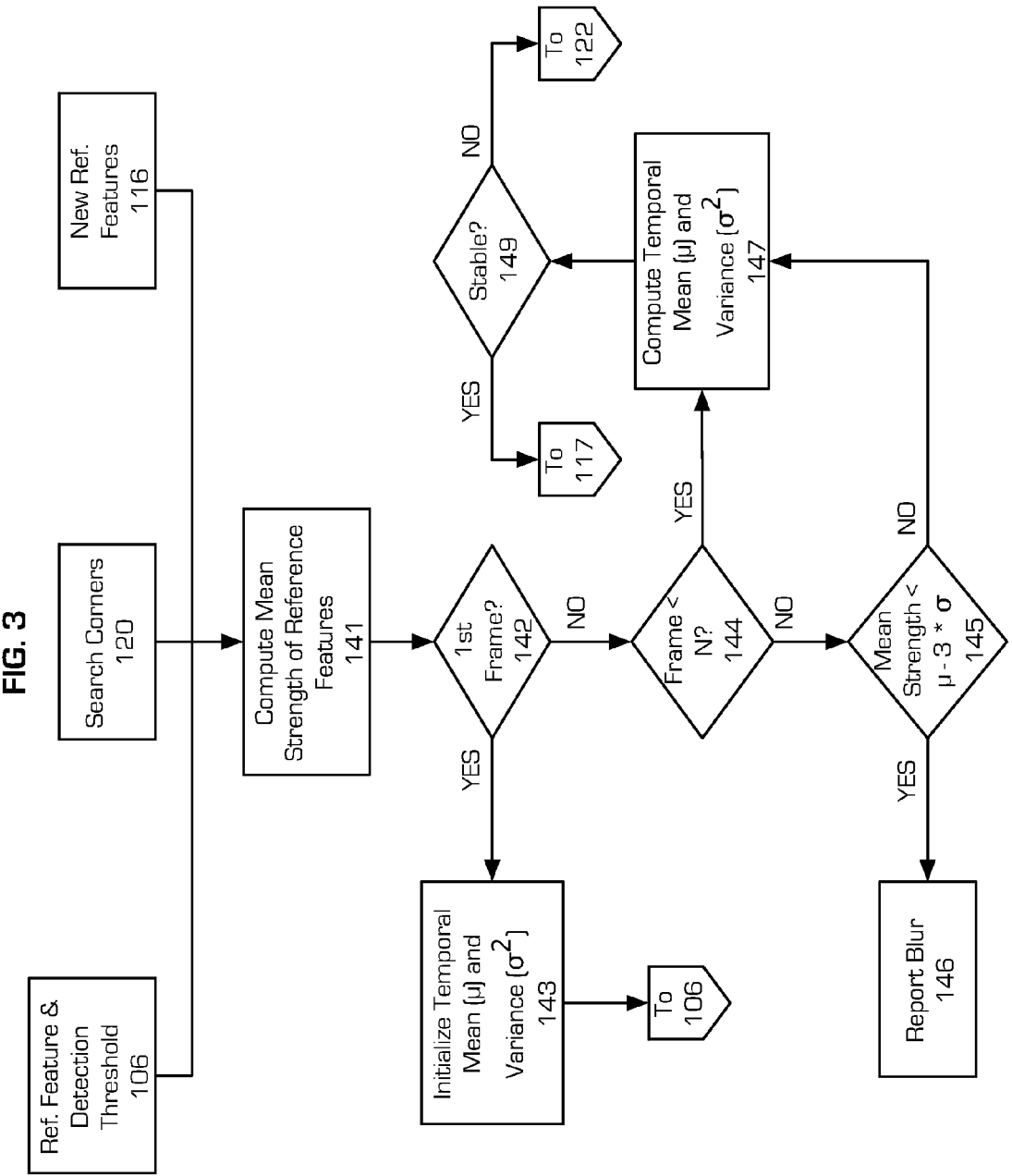
FIG. 3 illustrates a flow diagram of an image blur detection process implemented as a sub-process in Steps 106, 116 and 120 of the embodiment shown in FIG. 1.

FIG. 3 shows an embodiment of the image blur detection of the present invention being performed as an integral part of stabilization process. Although blur detection is shown in a separate flow diagram, the blur detection process is executed as a subprocess of the overall stabilization processing.

Step 141 follows steps 106, 120 or 116 of FIG. 1 and is used to compute mean strength of all reference features in the frame. If the frame is identified as the first frame being processed in step 142, the temporal corner strength mean is initialized to current frame mean corner strength and its variance is set to 0 in step 143. There after the processing returns to step 106 of FIG. 1.

In the case where the frame being processed is not the first frame, the step 144 is used to determine if a valid temporal mean and variance of corner points is available through processing of N number of frames. A typical value for N may be 30, however other values for N can be used as appropriate. In case the sequence number of frame being processed is less than N, the temporal mean and variance of mean strength is updated in step 147.

In step 147, the temporal mean corner strength for frame number t is computed as $\mu_t=(1-\lambda)\mu_{t-1}+\lambda X_t$, where $\lambda$ is a gain term typically in range of 0.1 to 0.01, $X_t$ is the mean corner strength of the current frame. Similarly, the variance of corner strength $\sigma_t^2$ for frame number t is updated as a $\sigma_t 2(1-\lambda)\sigma_{t-1}^2+\lambda(X_t-\mu_t)(X_t-\mu_t)$.

In the case where the frame number being processed is found to be greater than N in step 144, the mean corner strength of current frame is compared with the temporal mean corner strength in step 145. If the mean corner strength of current frame is found to be less than $\mu-3*\sigma$, the image is flagged as being blurred. In this situation, an image blur event is notified in step 147 and no further processing is carried out on the frame. Otherwise, the step 147 is performed to update temporal mean corner strength and variance followed by execution of steps 117 or 122.

Camera blinding leads to image homogeneity and results in a decrease in intensity variance. It is ideal to measure the local image variance at the corner features and compare these variance values across frames to sense image blinding as corner points are features having a high intensity gradient. Local variance at corner points is computed as part of the stabilization identification step 108 that involves normalized cross-correlation between the reference and current frame. A temporal mean ($\Pi$) and variance ($r^2$) of average local intensity variances measured over small image blocks around the corner points are used to detect camera blinding.

Figure 4:
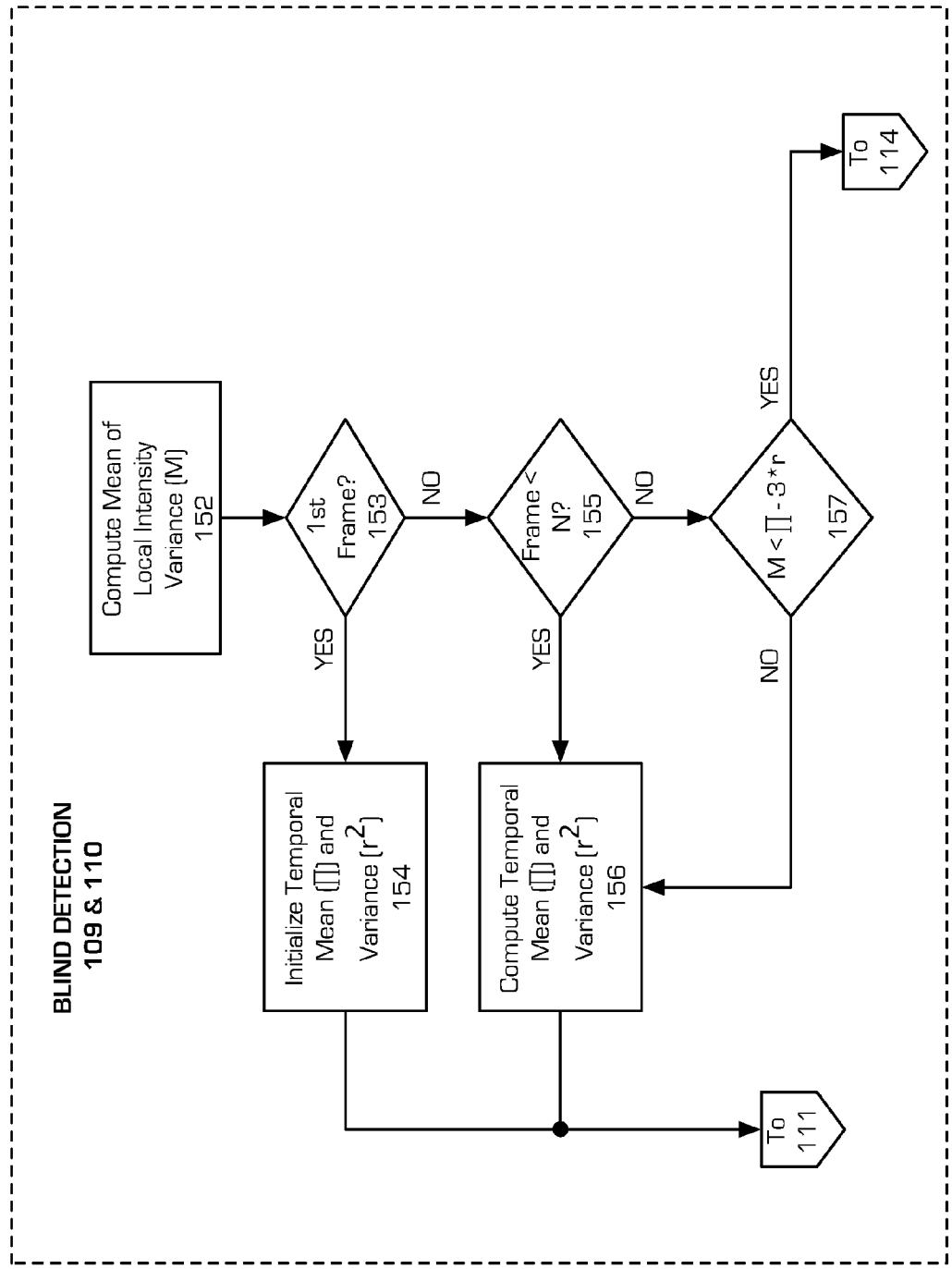
FIG. 4 illustrates a flow diagram of a camera blind detection process implemented in steps 109 and 110 of the embodiment shown in FIG. 1.

Referring to FIG. 4, a sub-process for performing an embodiment of the blind detection (steps 109 and 110 of FIG. 1) is shown. In step 152 a mean of all local intensity variances (M) measured at small image blocks centered on corner points is computed. If the frame is the first frame being processed in step 153, the temporal corner strength mean is initialized to current frame corner strength mean and its variance is set to 0 in step 154. There after the processing returns to step 111 of FIG. 1.

If the frame being processed is not the first frame, step 155 determines if a valid temporal mean and variance of local image variances is available through processing of N number of frames. A typical value for N could be 30; however other values of N can be used as well. If the sequence number of the frame being processed is less than N, the temporal mean and variance of local variances is updated in step 156.

In step 156, the temporal mean local image variance for frame number t is represented as $\Pi_t=(1-\lambda)\Pi_{t-1}+\lambda M_t$, where $\lambda$ is a gain term typically in range of 0.1 to 0.01, and $M_t$ is the mean of local image variance in the current frame. Similarly, the temporal variance of the local image variance $r_t^2$ for frame number t is represented as $r_t^2=(1-\lambda)r_{t-1}^2+\lambda(M_t-\Pi_t)(M_t-\Pi_t)$.

When the frame number being processed is found to be greater than N in step 155, the mean local variance of current frame is compared with the temporal mean local variance in step 157. If mean corner strength of current frame is found to be less than $\Pi-3*r$, the image is flagged as being blinded. In this situation, a camera blind event is reported in step 114 and no further processing is carried out on the frame. Otherwise, step 156 is performed to update the temporal mean of the local image variance and its variance followed by execution of step 111.

Figure 5:
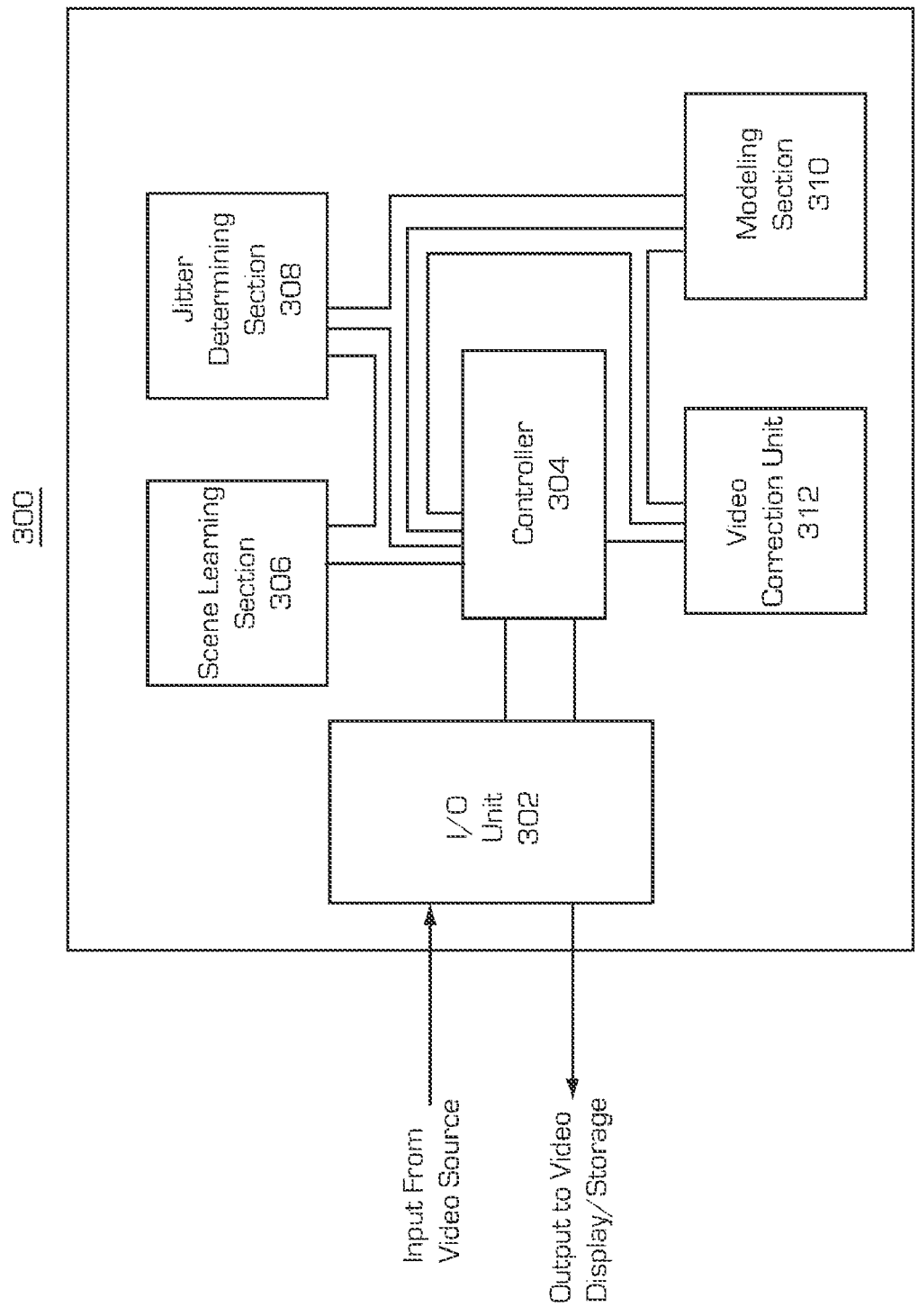
FIG. 5 illustrates a block representation of an embodiment of a real-time image stabilization system in accordance with the present invention.

Referring to FIG. 5, a block representation is shown of a real-time image stabilization system 300, in accordance with the present invention. In the real-time image stabilization system 300, an I/O unit 302 handles the receiving of input video as well as the output of processed video for display and/or storage.

The input video received by the I/O unit 302 is provided to a controller 304, which routes the video frames either to a scene learning section 306, if the frame is a first video frame; or to a jitter determining section 308 for subsequent video frames. Additionally, the controller 304 stores reference features and detection threshold values generated by the scene learning section 306. The reference features and detection threshold values may be stored either in a buffer integral to the controller 304 or in a separate storage unit, such as an external buffer or mass storage device.

The controller 304 provides the stored reference features and detection threshold values to the jitter determining section 308. The jitter determining section 308 utilizes the reference features and detection threshold values to identify video frames in which jitter is present.

As described above with respect to FIG. 1, when no jitter is detected, the uncorrected video frame is displayed. In the present embodiment, the uncorrected video frame is returned to the controller 304 from the jitter determining section 308, where the controller 304 provides the video frame to the I/O unit 302 for output to a display and or storage device.

The jitter determining section 308 performs steps 108 through 126 shown in FIG. 1. If the jitter determining section 308 identifies a FOV change, the controller 304 redirects the next frame to the scene learning section 306 to generate new reference features for the new field of view.

However, when jitter is detected, the video frame is transferred to a modeling section 310. The modeling section 310 utilizes random sample consensus to select a correction model for the frame, as shown in FIG. 2. The video frame is processed by the video correcting unit 312 to compensate for the jitter using the correction model. Once the video correcting unit 312 has corrected the video frame, the corrected video frame is provided to the controller 304. The controller 304, at this stage, outputs the corrected video frame to a display and/or storage unit via the I/O unit 302.

While the present invention has been described with respect to performing stabilization on real-time video, the present invention as described is also adapted to perform stabilization on stored video streams. Regardless of the source of the input video, the present invention performs stabilization on the input video and outputs the stabilized video in real-time.

The present invention can be implemented as an embedded system where a controller is hardwired with logical representations of the instructions for performing the stabilization method described above. The embedded system may employ application-specific integrated circuit (ASIC), field programmable gate array (FPGA), or other similar circuit devices.

Alternatively, the present invention can be implemented as a computer readable medium. Instructions for performing the steps of the present invention as outlined above can be provided on optical media such as CD-ROM, DVD-ROM, magnetic media, solid-state devices such as flash RAM, EPROM, ROM, static RAM, Multimedia cards (MMC), secure digital (SD) cards, or any other computer-readable medium as known in the art. The computer-readable medium can be integrated into an embedded system to provide instructions to a microcontroller adapted for executing the instructions. Moreover, the instructions embodied on the computer-readable medium can be read by, or installed on, a conventional computer system, or workstation, where the processor of the computer system is operative for executing the instructions.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method of video stabilization in real-time, comprising the steps of:
   providing a video stream as an input video;
   performing a scene learning process on a first frame of said input video to obtain reference features and a detection threshold value;
   determining stability of a current frame of said input video by comparing features of said current frame against said reference features using said detection threshold value;
   obtaining a set of corner points from said current frame using said detection threshold, if said current frame is determined to be unstable;
   matching said obtained corner points with reference corner points of said reference features;
   determining if a number of matched corner points is not less than a match point threshold value;
   modeling said current frame, if said number of matched corner points is not less than said match point threshold value; and
   correcting said video frame based on said modeling.

2. The method as in claim 1, wherein said scene learning process uses a low initial threshold value on said first frame.

3. The method as in claim 2, wherein said low initial threshold value is equal to zero.

4. The method as in claim 1, wherein said detection threshold value is determined by a strength of a point in a sorted list of reference features located at a predetermined position (N) in said sorted list, when said sorted list contains N or more points.

5. The method as in claim 4, wherein said detection threshold value is determined by the strength of a last point in said sorted list of reference features, when said sorted list contains less than N points.

6. The method as in claim 1, wherein said modeling is performed using random sample consensus.

7. The method as in claim 1, further comprising the step of relearning/updating said reference features.

8. The method as in claim 7, wherein said relearning/updating step is performed after a predetermined number of stable frames is detected.

9. The method as in claim 7, wherein said relearning/updating step is performed after a predetermined number of consecutive line-of-sight changes is detected.

10. The method as in claim 7, wherein said relearning/updating step is performed after a predetermined number of consecutive model errors exceeding a user-defined threshold is detected.

11. The method as in claim 7, wherein said relearning/updating step is performed at predefined frame intervals.

12. The method as in claim 1, further comprising a step of detecting image blur by performing the steps of:
   computing a mean corner strength of all corner points of said current frame;
   calculating a temporal mean ($\mu$) and variance ($\sigma^2$) of said average strength of said corner points of a predetermined number of frames;
   comparing said mean corner strength of said current frame with said temporal mean ($\mu$) when said current frame is a frame after said predetermined number of frames;
   reporting image blur if said comparison of said mean corner strength with said temporal mean ($\mu$) is less than $\mu - 3*\sigma$.

13. The method as in claim 1, further comprising a step of detecting image blinding by performing the steps of:
   computing a mean of all local intensity variances (M) in said current frame;
   calculating a temporal mean ($\Pi$) and variance ($r^2$) of said average local intensity variances of a predetermined number of frames;
   comparing said mean local intensity variances (M) of said current frame with said temporal mean ($\Pi$) when said current frame is a frame after said predetermined number of frames;
   reporting image blinding if said comparison of said mean local intensity variances (M) with said temporal mean ($\Pi$) is less than $\Pi - 3*r$.

14. A system for performing video stabilization in real-time, comprising:
   a video source for generating a video stream having a plurality of video frames;
   a scene learning section for performing a scene learning process on a first frame of said video stream to obtain reference features and a detection threshold value;
   a jitter determining section for determining a presence of jitter in a current frame of said video stream by comparing features of said current frame against said reference features using said detection threshold value;
   a modeling section for modeling said current frame if a number of corner points matched between corner points of said current frame and corner points of said reference features is not less than a match point threshold value; and
   a video correction unit for generating a corrected frame of said current frame based on said modeling.

15. The system as in claim 14, further comprising a storage unit for storing said reference features, said detection threshold value and said corrected frame.

16. The real-time video stabilization system as in claim 14, wherein said scene learning section uses a low initial threshold value on said first frame.

17. The system as in claim 16, wherein said low initial threshold value is equal to zero.

18. The real-time video stabilization system as in claim 14, wherein said detection threshold value is determined by a strength of a point in a sorted list of reference features located at a predetermined position (N) in said sorted list when said sorted list contains N or more points.

19. The system as in claim 18, wherein said detection threshold value is determined by the strength of a last point in said sorted list of reference features when said sorted list contains less than N points.

20. The system as in claim 14, wherein said modeling is performed using random sample consensus.

21. The system as in claim 14, wherein said scene learning section performs a relearning/updating of said reference features.

22. The system as in claim 21, wherein said relearning/updating is performed after a predetermined number of stable frames is detected.

23. The system as in claim 21, wherein said relearning/updating is performed after a predetermined number of consecutive line-of-sight changes is detected.

24. The system as in claim 21, wherein said relearning/updating is performed after a predetermined number of consecutive model errors exceeding a user-defined threshold is detected.

25. The system as in claim 21, wherein said relearning/updating is performed at predefined frame intervals.

26. The system as in claim 14, further comprising an image blur detector for reporting image blur if a comparison of a mean corner strength of a current frame against a temporal mean of an average strength of corner points calculated from a predetermined number of previous frames is less than $\mu - 3*\sigma$, where $\mu$ is said temporal mean and $\sigma$ is a standard deviation of said average strength of said corner points.

27. The system as in claim 14, further comprising an image blind detector for reporting image blinding if a comparison of a mean of all local intensity variances (M) against a temporal mean ($\Pi$) of said average local intensity variances of a predetermined number of previous frames is less than $\Pi - 3*r$, where r is a standard deviation of said average local intensity variances.

28. A non-transitory computer readable medium embodying a set of instructions executable by a processor for performing a method of video stabilization in real-time, said method comprising the steps of:

providing a video stream as an input video; performing a scene learning process on a first frame of said input video to obtain reference features and a detection threshold value;

determining stability of a current frame of said input video by comparing features of said current frame against said reference features using said detection threshold value;

obtaining a set of corner points from said current frame using said detection threshold, if said current frame is determined to be unstable;

matching said obtained corner points with reference corner points of said reference features;

determining if a number of matched corner points is not less than a match point threshold value;

modeling said current frame, if said number of matched corner points is not less than said match point threshold value; and correcting said video frame based on said modeling.

* * * * *